(12) United States Patent
Coffland et al.

(10) Patent No.: US 7,876,216 B2
(45) Date of Patent: Jan. 25, 2011

(54) OBJECT LOCATION AND REPORTING SYSTEM FOR HARSH RF ENVIRONMENTS

(75) Inventors: Donald W. Coffland, Seattle, WA (US); Sujith N. Mally, Bellevue, WA (US); Russell N. Tice, Renton, WA (US)

(73) Assignee: The Boeing Company, Chicago, IL (US)

( * ) Notice: Subject to any disclaimer, the term of this patent is extended or adjusted under 35 U.S.C. 154(b) by 276 days.

(21) Appl. No.: 12/145,604

(22) Filed: Jun. 25, 2008

(65) Prior Publication Data

US 2009/0322516 A1 Dec. 31, 2009

(51) Int. Cl.
*G08B 1/08* (2006.01)
(52) U.S. Cl. ............... 340/539.13; 340/539.1; 340/680; 340/825.49; 340/825.69; 340/825.72; 700/108; 73/862.21
(58) Field of Classification Search ......... 340/680, 340/539.1, 539.13, 539.21, 539.23, 825.49, 340/825.69, 825.72; 700/108, 114; 73/862.21, 73/862.23; 81/469, 479; 702/41, 150
See application file for complete search history.

(56) References Cited

U.S. PATENT DOCUMENTS

| 6,796,190 | B2 | 9/2004 | Curry | |
|---|---|---|---|---|
| 6,927,688 | B2 | 8/2005 | Tice | |
| 6,968,759 | B2 | 11/2005 | Becker et al. | |
| 2005/0092143 | A1 | 5/2005 | Lehnert et al. | |
| 2008/0178713 | A1* | 7/2008 | Long et al. | 81/467 |
| 2008/0306622 | A1* | 12/2008 | Bailey et al. | 700/114 |

FOREIGN PATENT DOCUMENTS

| DE | 102005016361 A1 | 10/2006 |
|---|---|---|
| DE | 102006044937 A1 | 4/2008 |
| EP | 09 25 1616 | 9/2009 |
| JP | 2004118304 A | 4/2004 |
| JP | 2006-98186 | 4/2006 |

OTHER PUBLICATIONS

Y.-H. Jo, J.-Y. Lee, D.-H. Ha, and S.-H. Kang, "Accuracy Enhancement for UWB Indoor Positioning Using Ray Tracing," in Proc. IEEE ION, 2006.

S. F. A. Shah and A. H. Tewfik, "Enhanced Position Location with UWB in Obstructed LOS and NLOS multipath environments," in Proc. Eusipco 2005.

A. Eltaher and T. Kaiser, "A Novel Approach based on UWB Beamforming for Indoor Positioning in None-Line-of-Sight Environments," in Proc. 2005 RadioTeCc, Oct. 2005.

(Continued)

*Primary Examiner*—Hung T. Nguyen
(74) *Attorney, Agent, or Firm*—Tung & Associates

(57) ABSTRACT

A system verifies torquing of pressure fittings in an aircraft wheel well. A strain gauge and an ultra-wide band (UWB) pulse signal generator are placed on a wrench used to torque the fittings. The strain senses the torque applied by the wrench, and the pulse signal generator generates UWB pulse signals indicating the location of the fitting and the torque applied to the fitting. The pulse signals are received by UWB radios within the wheel well, which generate location measurements based on the received pulse signals. A processor automatically calculates the location of the fitting being torqued based on the location measurements, and a display produces a 3-dimensional image of the fittings and their torque status.

6 Claims, 9 Drawing Sheets

OTHER PUBLICATIONS

W. C. Chung and D. S. Ha, "An Accurate Ultra Wideband (UWB) Ranging For Precision Asset Location," in Proc. IEEE Conf. Ultra Wideband Systems and Technologies, 2003.

T. C. Chou, "Evaluation of UWB Techniques for Indoor Position Locationing," Oregon State University Master Thesis, Jun. 2005.

Perkins, C., "Ad hoc On-Demand Distance Vector (AODV) Routing", Network Working Group, RFC 3561, Jul. 2003.

Agarwal, A. and S. Das, "Dead Reckoning in Mobile Ad-Hoc Networks", IEEE WCNC 2003, the 2003 IEEE Wireless Communications and Networking Conference, Mar. 2003.

Snap-on Techwrench Technical Page, dated Nov. 30, 2005.

* cited by examiner

US 7,876,216 B2

OBJECT LOCATION AND REPORTING SYSTEM FOR HARSH RF ENVIRONMENTS

CROSS REFERENCE TO RELATED APPLICATIONS

This application is related to co-pending U.S. patent application Ser. Nos. 12/145,623, and 12/145,637 both filed concurrently herewith on Jun. 25, 2008, each of which applications is incorporated by reference herein in its entirety.

TECHNICAL FIELD

This disclosure generally relates to object location systems, and deals more particularly with a system for locating, monitoring and/or reporting a condition of the object within a harsh RF environment.

BACKGROUND

During the production of complex assemblies, such as aircraft, there is sometimes a need to monitor assembly operations and verify that certain operations have been properly performed on a subassembly. For example, aircraft landing gear may be controlled by one or more hydraulic systems comprising hundreds of hydraulic tubes and fittings that must be assembled within a relatively small wheel well. Each of these fittings includes a nut that is tightened or "torqued" by an assembly worker to a nominal torque value. Because of the large number of nuts that must be torqued, it is desirable to monitor and verify that all of the nuts have been properly torqued, since the failure to properly assemble fittings, and/or torque nuts to nominal values may result in hydraulic leaks that must be later corrected. Past attempts to verify that nuts have been properly torqued have been limited to the application of marks on the nuts in order to visually indicate that they have been torqued, however this technique may be subject to human error, and in any event, may not allow verification that the nut has been torqued to the correct value.

A variety of techniques have been developed for locating and monitoring objects such as parts and subassemblies in three dimensional space, including those utilizing radio frequency (RF), optic, sonic and chemical communication, however, each has limitations in terms of accuracy and effectiveness within harsh communications environments. For example, known object location systems may be ineffective in those environments where line-of-sight (LOS) to the object is not available, or where structures or surfaces within the environment result in signal reflection and/or attenuation.

Known object location systems may not be well suited for monitoring the proper assembly of the hydraulic tube fittings, because these locating systems may not be capable of either locating the nuts, or locating the nuts with sufficient accuracy to distinguish between closely spaced nuts within a highly confined, crowed environment such as a wheel well. Moreover, the use of RF techniques to monitor nut torquing is particularly challenging due to the adverse effects of multipath caused by the abundance of metallic objects in a wheel well environment, and the complex physical layout of the wheel well which lacks fixed positioning system infrastructure.

Accordingly, there is a need for a system for locating and reporting the condition of objects within a harsh RF environment such as a wheel well in an aircraft.

SUMMARY

The disclosed embodiments provide a system for locating and monitoring objects in harsh RF environments and for reporting at least one condition of the object. The system may be used, for example, in monitoring and verifying that certain operations have been performed on components or subassemblies during the production of complex assemblies, such as aircraft. One advantage of the disclosed system resides in its ability to detect the position of an object with a high degree of precision, even in harsh RF environments having an abundance of metal parts and lacking fixed infrastructure. In addition to locating objects, the system may transmit data representing a condition, such as a torque value in applications where the system is used to monitor torquing of nuts within a wheel well of an aircraft. The disclosed embodiments further include a reporting and display system that provides an image of the located object within a three dimensional display of its surrounding environment, as well as a display of acquired data relating to the condition of the object.

Robust location monitoring in harsh RF environments is achieved through the use of low power ultra-wideband (UWB) based techniques that minimize the effects of signal reflection, signal attenuation and lack of LOS in the harsh RF environment. The disclosed embodiments advantageously utilize signal processing and receivers that maintain required accuracy for robust operation in those situations where the LOS from a transmitter to one of the receivers is blocked. This is achieved by installing extra receivers above the minimum required for performing time delay of arrival (TDOA) processing and then performing signal processing to identify the receiver that is not in LOS with respect to the transmitter.

In one application, the disclosed embodiments may be useful in supporting a knowledge-based manufacturing control system providing real time information that may be advantageously used in assembly processes such as those used in the aircraft industry. The system allows assembly workers and quality control personnel to quickly and easily identify which assembly tasks have been completed and which not have yet been completed, along with quantitative data indicating whether the assembly operations satisfy nominal specifications.

According to one disclosed embodiment, a system is provided for locating and reporting at least one condition of each of a plurality of objects within a harsh RF environment. The system comprises: a portable, ultra-wideband (UWB) pulse signal generator moveable to the location of each of the objects and operative for transmitting UWB pulse signals reporting a condition of the object at the location; a group of UWB radios within the harsh RF environment for receiving the transmitted UWB pulse signals from the pulse signal generator and for generating measurements related to the position of the pulse signal generator based on the received UWB pulse signal; a processor for calculating the three dimensional position of the pulse signal generator using the measurements generated by the UWB radios; and, a system for displaying an image of the object whose condition is being reported, and for displaying the reported condition of the object. The system may further comprise a tool for performing an operation on each of the objects, wherein the pulse signal generator is mounted on the tool, and the reported condition is related to the operation performed on the object by the tool. The tool may comprise, for example and without limitation, a wrench and the object may comprise a threaded fitting.

According to another disclosed embodiment, a system is provided for monitoring the use of a tool used to complete an operation on each of the plurality of subassemblies in a harsh RF environment within an aircraft. The system comprises: means on the tool for sensing the completion of an operation on the subassembly; a UWB pulse signal generator coupled with the sensing means for transmitting UWB pulse signals reporting the completion of the operation; a group of UWB radios within the aircraft for receiving the transmitted UWB pulse signals from a pulse signal generator, and for generating measurements related to the position of the pulse signal generator; means coupled with the group of UWB radios for calculating the three dimensional position of the tool using the measurements generated by the UWB radio; and, display means for displaying an image of the subassembly on which the operation has been completed by the tool. The tool may comprise a wrench, and the sensing means may comprise a strain gauge for sensing the torque applied by the wrench to the subassembly. The display means may include a data set file representing a three dimensional view of the plurality of subassemblies, and a display for displaying the three dimensional view of the subassemblies as well as the status of the completion of an operation on at least one of the subassemblies. The calculating means may include a data compilation program for compiling the measurements, and a processor for calculating the three dimensional position of the tool using the data compilation program. The system may further comprise a receiver for assembling the measurements generated by the UWB radios and for transmitting the assembled measurements to the calculating means.

According to a disclosed method embodiment, acquiring data relating to each of a plurality of objects located within a harsh RF environment comprises: moving a sensor to the location of each of the objects; sensing data at the object; transmitting the sensed data from the location of the object using UWB pulse signals; receiving the UWB pulse signals at multiple positions within the harsh environment; using the received UWB pulse signals to generate location measurements related to the location of the object from which the sensed data was transmitted; using the location measurements to determine the location of the object in a first coordinate system; and, displaying an image of the object from which the sensed data was transmitted in a second coordinate system. The first coordinate system may be a coordinate system within the harsh RF environment, and display of the image of the object may include displaying a three dimensional image of the objects in the harsh RF environment from a graphics file wherein the second coordinate system is in the three dimensional image of the objects. The method may further comprise placing the sensor on a tool and performing an operation on the objects using the tool, wherein the sensed data relates to the operation performed on the objects. The tool may comprise a wrench and the sensor may comprise a strain gauge. Generating the location measurements may include measuring the angle of arrival and the time difference of arrival of the pulse signals at each of the multiple locations.

According to a further method embodiment, monitoring a tool used to complete an operation on subassemblies in a harsh RF environment within an aircraft, comprises: transmitting UWB pulse signals from the location of the subassembly indicating an operation has been performed on the subassembly; receiving the pulse signals at UWB radios within the harsh environment; using the pulse signals to generate location measurements related to the location of the subassembly from which the pulse signals are transmitted; using the location measurements to determine the location of the subassembly from which the pulse signals are transmitted in a coordinate system of a harsh RF environment; and, displaying the subassembly from which the pulse signals are transmitted within a three dimensional image of the harsh RF environment. The method may further comprise placing a UWB pulse signal generator on the tool for transmitting the pulse signal; and using a sensor on the tool for sensing a condition indicating that the operation has been performed on the subassembly. The method may also comprise placing the UWB radios in locations within the harsh RF environment such that at least two of the UWB radios are within the LOS of each of the subassemblies.

The disclosed embodiments satisfy the need for a system and related method for locating objects within a harsh RF environment and for reporting at least one condition relating to the object.

Other features, benefits and advantages of the disclosed embodiments will become apparent from the following description of embodiments, when viewed in accordance with the attached drawings and appended claims.

BRIEF DESCRIPTION OF THE ILLUSTRATIONS

DETAILED DESCRIPTION

Figure 1:
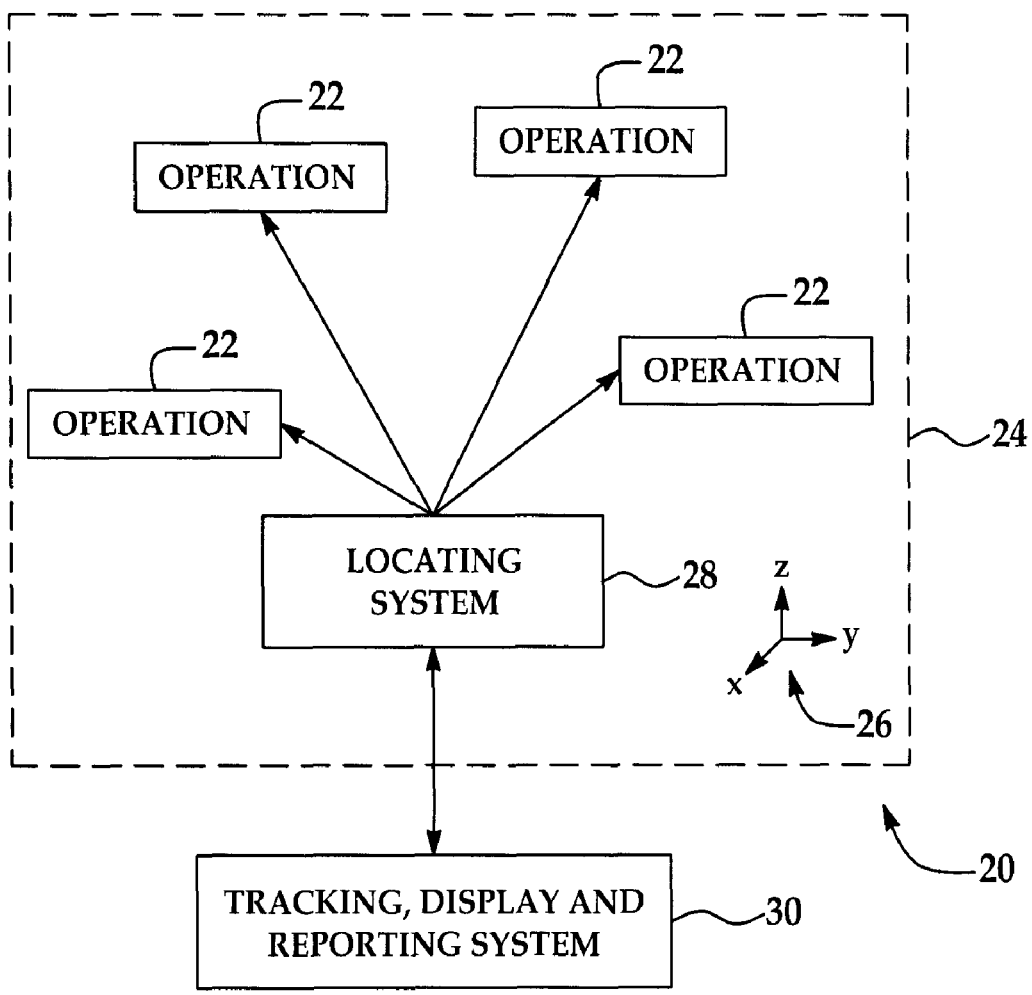
FIG. 1 is a block diagram of a system for locating objects in a harsh RF environment.

Referring first to FIG. 1, the disclosed embodiments broadly relate to a system generally indicated by the numeral 20 for locating each of a plurality of objects 22 positioned within a harsh RF environment 24, and for reporting at least one condition related to the located object 22. The three dimensional location of each of the objects 22 may be defined in a three dimensional coordinate system 26 within the harsh RF environment 24. As used herein, "harsh RF environment" is intended to mean environments in which obstructions or other environmental factors result in RF signal reflection, signal attenuation and/or signal blockage due to the lack of LOS between transmitter and receiver.

The locating and reporting system 20 may include a UWB pulse signal locating system 28 within the harsh RF environment 24, and a monitoring, display and reporting system 30 which monitors the location of the objects 22 within the coordinate system 26 and displays these objects and reported condition within a second, later discussed coordinate system. As will be discussed below in more detail, the system 20 may be used to locate each of the objects 22 directly or indirectly by locating a portable component such as a tool which is moved to the location of each of the objects 22.

UWB location monitoring is advantageous in many applications because of the ability of UWB signals to penetrate walls and other solid objects while maintaining resistance to multipath (or Raleigh) fading. Moreover, UWB location monitoring may possess interoperability with other radio frequency based communication systems. Although UWB signals may be able to penetrate most solid objects, these signals may be reflected off of metallic objects, creating multipath effects unless an appropriate transmission protocol is selected.

Figure 2:
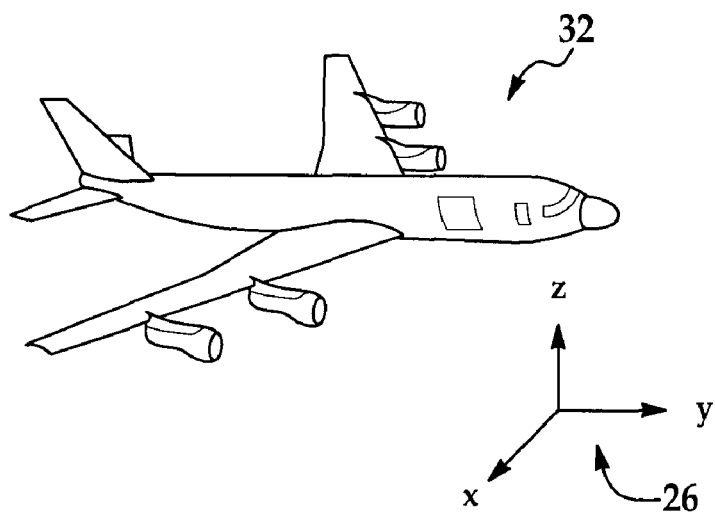
FIG. 2 is a perspective view of an aircraft, including a three dimensional coordinate system used to define the location of objects within the aircraft.
Figure 3:
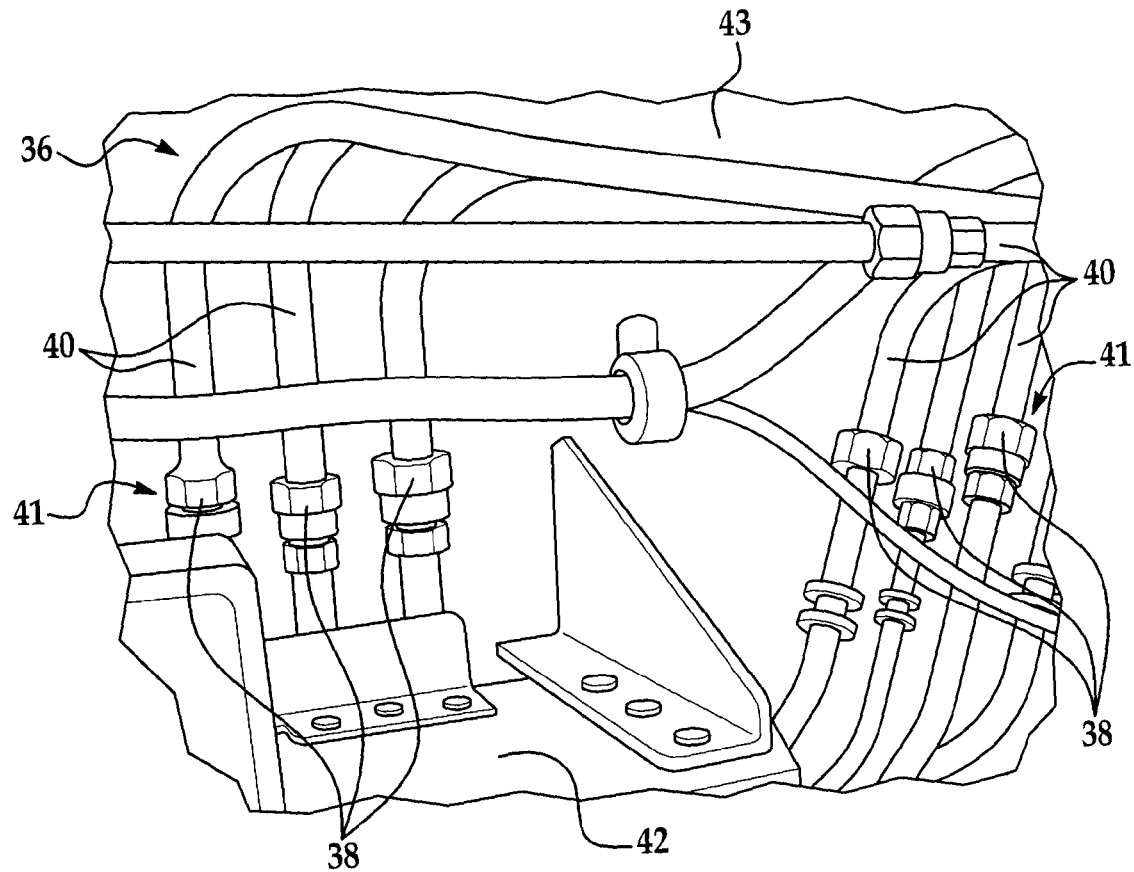
FIG. 3 is a perspective view showing a portion of a wheel well forming part of the aircraft shown in FIG. 2.

Referring to FIG. 2, the locating and reporting system 20 may be used to locate objects 22 on an aircraft 32 in which object space may be defined in a three dimensional coordinate system 26 of the aircraft 32. The object 22 may comprise, without limitation, subassemblies (not shown) upon which operations are performed during the production and assembly of the aircraft 32. For example, as shown in FIG. 3, a wheel well 36 on the aircraft 32 may contain a multiplicity of hydraulic tubes 40 having threaded fittings 41 provided with nuts 38 for connecting and tightening the fittings 41. The wheel well 36 may include various metallic structures 42 used for reinforcement or component mounting that preclude LOS within the wheel well 36 and/or reflect or attenuate RF signals. In some cases, the nuts 38 may be located in close quarters to which there may be limited access, as where they are tightly grouped, for example, against a bulkhead 43.

Figure 4:
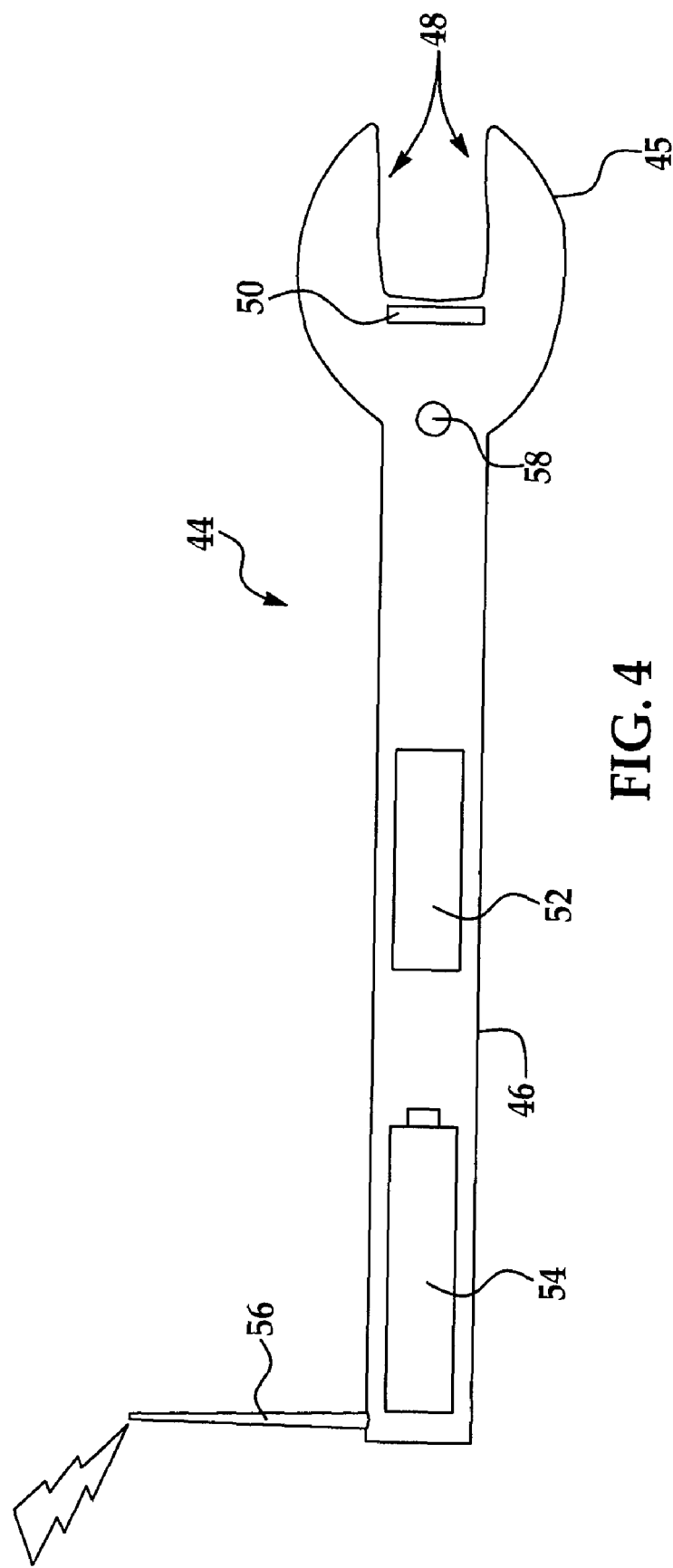
FIG. 4 is a side view of a wrench used to torque nuts on the hydraulic fittings shown in FIG. 3.
Figure 5:
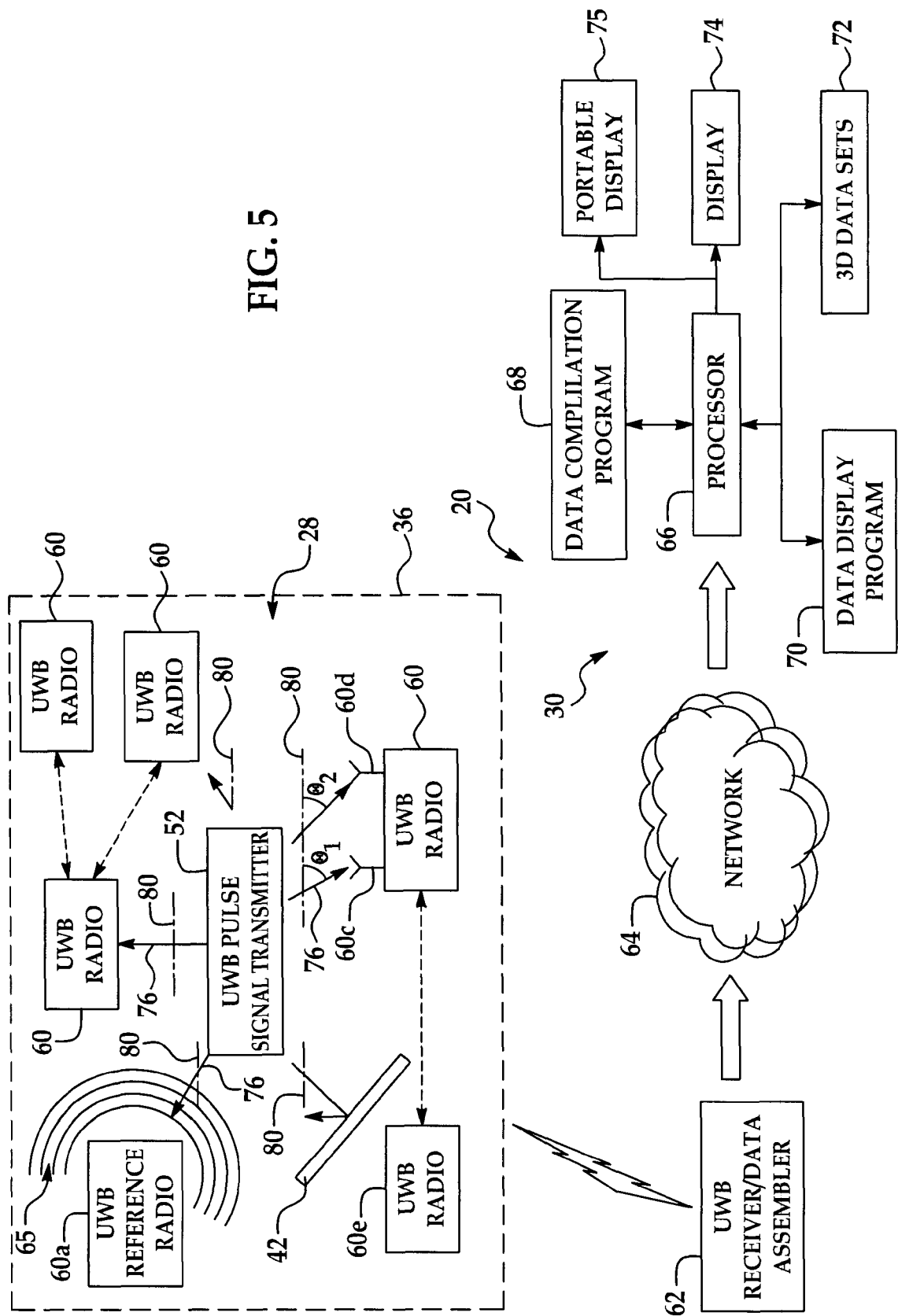
FIG. 5 is a combined block and diagrammatic illustration of a system for locating and reporting the condition of objects within a harsh RF environment.

Reference is now made to FIGS. 4-7 which depict additional details of the locating and reporting system 20 adapted for use in locating and reporting the torque condition of the nuts 38. In this application, as best seen in FIG. 5, the system 20 utilizes a UWB pulse signal locating system 28 which comprises a UWB pulse signal generator 52 carried on an electronic wrench 44, and a plurality of UWB radios 60 that are optimally positioned within the wheel well 36 such that at least two of the UWB radios 60 are within the LOS of each of the nuts 38.

As shown in FIG. 4, the electronically monitored torque wrench 44 used to torque the nuts 38 includes a head 45 mounted on the end of a handle 46. The head 45 includes jaws 48 for engaging the flats of the nuts 38, and a strain gauge sensor 50 mounted near the jaws 48. The strain gauge sensor 50 produces an electrical signal related to the magnitude of the torque applied to a nut 38 by the wrench 44.

The UWB pulse signal generator 52 is contained within the handle 46 and transmits UWB pulse signals on an antenna 56 carried on or within the handle 46. The UWB pulse signals generated by the UWB pulse signal generator 52 may include data representing the magnitude of torque sensed by the strain gauge 50. Although not shown in the drawings, the wrench 44 may include a measuring and triggering circuit which measures the amount of torque sensed by the strain gauge 50 and triggers the pulse signal generator 52 to transmit signals when a threshold torque value has been sensed, representing, for example and without limitation, a nominal torque value for the nuts 38. An indicator light 58, which may comprise for example, without limitation, an LED, is mounted on the head 45. The indicator light 58 is operated by the measuring and triggering circuit to provide the assembly worker with a visual indication when the nominal torque value has been reached. The pulse signal generator 52 as well as the light 58 and related measuring and triggering circuit may be powered by a battery 54 housed within the handle 46 of the wrench 44.

Aircraft wheel well applications typically may lack infrastructure that could otherwise provide references useful in making location measurements. Accordingly, the nodes, i.e. radios 60 may be deployed at positions that optimize LOS communication with the locations where the nuts 38 are to be torqued. The common coordinate system 26 established within the wheel well 36 allows estimations of locations within a common frame of reference. It may also be desirable to optimize the transmission protocol in order to reject reflective signals by using timing techniques carried in the leading edge of the transmitted, UWB pulse signals.

According to one embodiment, the generated pulse signals may be baseband signals that are mixed by a mixer to move their center frequency to the desired frequency bands which may be, in an application involving monitoring of nut torquing within a wheel well 36, around 4 GHz, providing an effective spectrum of approximately 3.1 to 5.1 GHz, and location measurement accuracy less than approximately one-half inch. In other applications, a UWB pulse signal generator 52 having a center frequency of approximate 6.85 GHz for a full FCC part 15 spectrum spread of 3.1-10.6 GHz, may be appropriate.

In accordance with the disclosed embodiments, the deployment of ad hoc nodes in the form of the radios 60 can be used to navigate around any blockages in the LOS between the location of the pulse signal generator 52 and the radios 60. Various reference materials exist in the art which teach suitable methods and techniques for resolving positional estimates in a network of ad hoc nodes including, for example and without limitation the following:

"Robust Header Compression WG", URL: http://www3.ietf.org/proceedings/04nov/slides/rohc-0.pdf Perkins, C., "Ad hoc On-Demand Distance Vector (AODV) Routing", Network Working Group, RFC 3561, July 2003.

Agarwal, A. and S. Das, "Dead Reckoning in Mobile Ad-Hoc Networks", IEEE WCNC 2003, the 2003 IEEE Wireless Communications and Networking Conference, March 2003.

Thales, Research & Technology Ltd. "Indoor Positioning", URL: http://www.thalesresearch.com/Default.aspx?tabid=166

Some of the techniques disclosed in the reference material cited above use iterative lateration of the generated pulse signals by solving a constraint based positional model. While this approach may be satisfactory for some applications, in other applications, such as locating nuts within an aircraft wheel well it may be necessary that the ad hoc network be propagated with position aware nodes in order to provide the desired results.

As will be discussed below in more detail, the UWB radios 60 receive the pulse signals from the wrench 44 and generate location measurements that may be used to calculate the location of the wrench 44, and thus, the location of the nut 38 being torqued by the wrench 44. In other embodiments, it may be possible to use one or more UWB radios 60b which include a pair of spaced apart receiving antennas 60c, 60d. The UWB radio 60b generates location measurements based on the angle of arrival (AOA) and the time difference of arrival (TDOA) of the pulse signals 76 transmitted by the pulse signal generator 52 on the wrench 44. In the case of the UWB radio 60b, the pulse signals 76 arrive respectively at the two antennas 60c, 60d at slightly different angles $\theta_1$ and $\theta_2$ relative to a reference axis 80 that is based in the coordinate system 26 (FIGS. 1 and 2) used to locate the nuts 38 in the three dimensional object space. Similarly, UWB radios 60 each measure the AOA and TDOA of the arriving pulse signals 76 relative to the reference axis 80. The AOA and TDOA measurements generated by at least two of the radios 60 may then be used to calculate the three dimensional location of the pulse signal generator 52 (and thus the wrench 44 and nut 38) using common iterative lateralization techniques.

Any of several different techniques may be employed for measuring the AOA positioning. One such method has been previously described in which the UWB radio 60b includes two spaced apart receiving antennas 60c, 60d each of which receives the signal transmitted by the pulse signal generator 52. The angle of the line connecting the radio 60 and the torque wrench 44 is measured with respect to source data stored in the 3D data set files 72. This reference angle corresponds to the orientation of the line intersecting each of the collocated antennas 60c, 60d. By measuring orientation to multiple reference antennas, the position of the torque wrench 44 may be determined.

Various techniques can be used for measuring TDOA. One such method involves receiving the transmitted pulse signals by multiple UWB radios 60 and dedicating one of the receiving radios 60a to calibrating the remaining radios 60 in the network. The receiving radio 60 determines the direct path to the intended torque wrench 44 by measuring the TDOA of the signal. At least four such measurements may be required to determine the position of the torque wrench 44 by interative lateration.

The performance of the radios 60 may be measured in terms of the packet success rate, accuracy of measured vs. actual distance, standard deviation and the signal/noise levels. The packet success rate may be defined as the number of successful packet exchanges between the radios 60. The measured distance is computed by processing the UWB pulse signals transmitted by the pulse signal generator 52. The actual distance is the distance between two receiving radios 60 as measured using a physical device. The standard deviation is a measure of how widely the measured distance values are dispersed from the mean. The signal and noise levels may be computed from the signal waveform as follows:

$$SignalLevel = 10 * \log\left(\frac{SquareofMaxValueofADCCounts}{2}\right)$$

$$NoiseLevel = 10 * \log(NoiseVarianceof5nsOfTheWaveform)$$

The system 28 may include a UWB reference radio 60a which broadcasts a beacon signal 65 that is used to calibrate the UWB radios 60. Because of the close quarters and various obstructions such as structure 42 that may be present within the wheel well 36, one or more of the UWB radios, such as UWB radio 60c may not be within the LOS of the pulse signal generator 52. The required accuracy or location measurement where the LOS between the transmitter 52 and one of the radios 60 is blocked can be overcome by installing extra radios 60 over the minimum number required for normal TDOA calculations, and then performing signal processing algorithms to identify the particular receiver that is not within LOS with the pulse signal generator 52.

The location measurements generated by the UWB radios 60 may be transmitted from the system 28 to a UWB receiver and data assembler 62 which assembles the location measurements, along with the torque data forming part of the pulse signals transmitted from the wrench 44. Depending upon the application, the assembled data may be transmitted through a network 64 to the monitoring, display and reporting system 30. The networks 54 may comprise, for example and without limitation, a WAN, LAN or the Internet. The monitoring, display and reporting system 30 may include a processor 68, data compilation program 68, data display program 70, three dimensional data set files 72 and one or more displays, such as the display 74 and a portable display 75.

The processor 66 may comprise a programmed PC which uses the compilation program 68 to calculate the position of the pulse signal generator 52 based on the location measurements. The processor 66 also uses the display program 70 to cause the display of images which illustrate or highlight the location of the nut 38 being torqued within a three dimensional image produced from the data set files 72. The three dimensional data set files 72 may comprise, for example and without limitation, a CAD file produced by any of various solid modeling programs such as, without limitation, CATIA. In effect, the system 30 maps the locations of the nuts 38 to data set coordinates in the solid modeling program.

Figure 6:
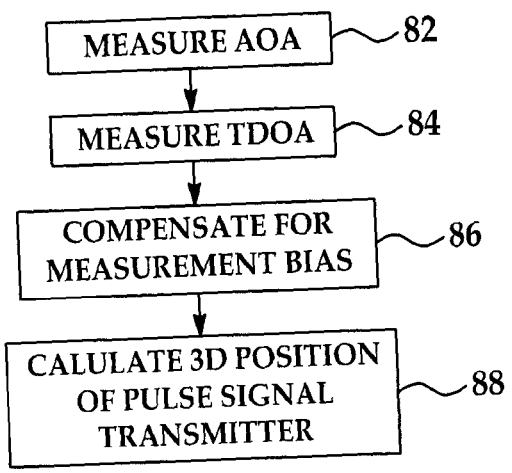
FIG. 6 is a simplified flow diagram of a method for determining the three dimensional position of the pulse signal generator shown in FIG. 5.

The method for calculating the position of the pulse signal generator 52 is illustrated in FIG. 6 in which the AOA and TDOA are respectively measured at 80 and 84 by the UWB radios 60. In some cases, measurement bias may be introduced as a result of the lack of LOS between radios 60, and incorrect lock on the signal to detect direct path or leading edge of the signal. This is due to the consistent leading edge detection occurring at the shortest path between the radios 60. This measurement bias may be compensated using any of several methods, including using leading edge algorithms using look-up tables for regions within the wheel well 36 to compensate for the bias or for counting for the error as position errors. Accordingly, compensation may be made at 86 for the measurement bias. Finally, at 88, the processor 66 calculates the three dimensional position of the pulse signal generator 52 within the coordinate system 26 of the harsh RF environment 24, which in the illustrated example, comprises the wheel well 36.

Figure 7:
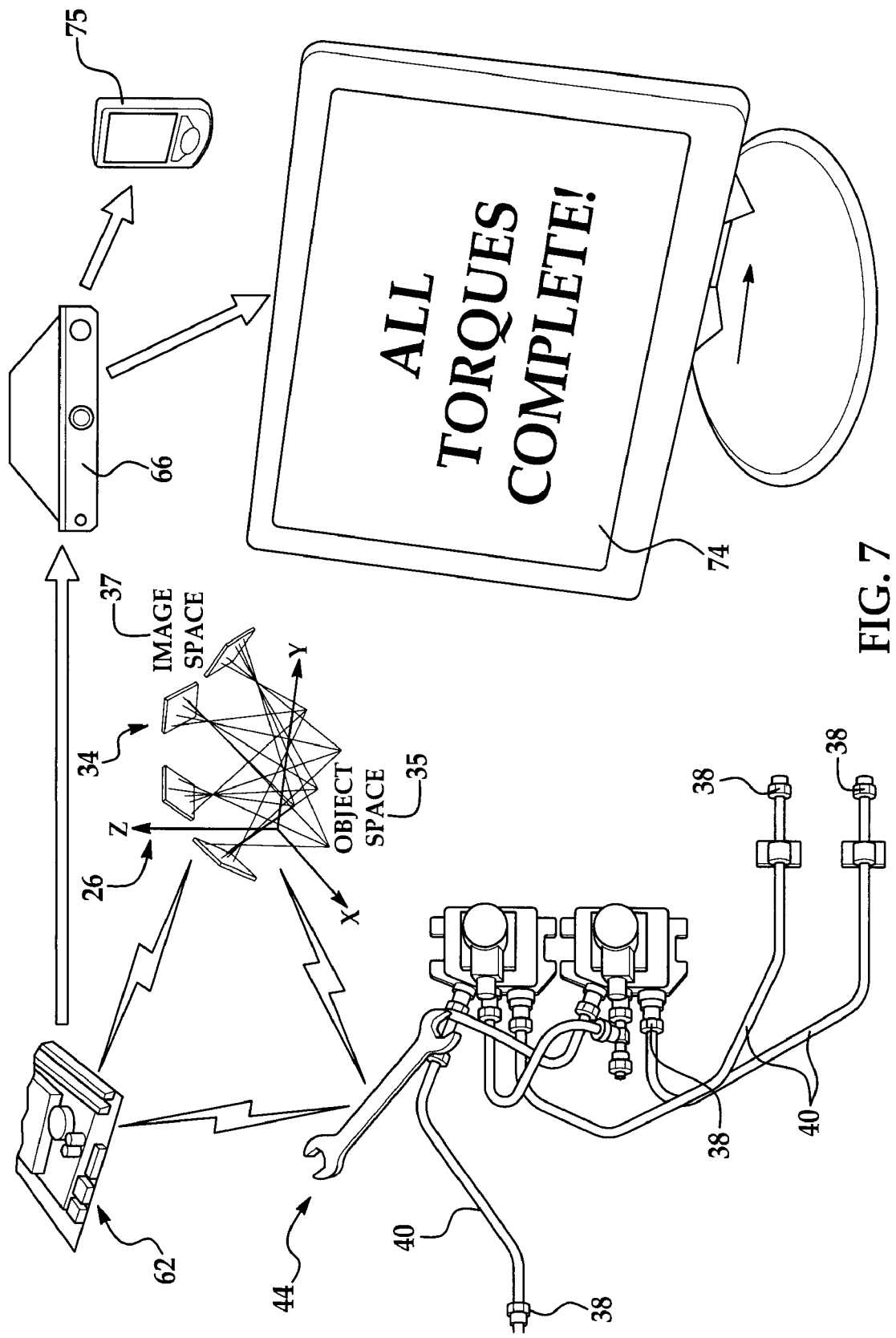
FIG. 7 is a diagrammatic illustration showing the major components of the locating and reporting system.

Referring now particularly to FIG. 7, the displays 74, 75 each combine graphic and quantitative data in real time to provide a display of the current state of the wheel well 36. In order to display the nut 38 being torqued in a three dimensional reference image assembled from the 3D data set files 72, the processor 66 mathematically translates the 3D location of the pulse signal generator 52 in the coordinate system 26 of wheel well 36, to a second coordinate system 34 of the 3D image created from the data set files 72. The first coordinate system 26 effectively defines object space 35, i.e. the 3D space in which the wrench 44 is moved from nut-to-nut 38, and the coordinate system 34 defines the image space 37 containing the displayed the image created from the 3D data set files 72.

The main display 74 may be used by production personnel to remotely locate, monitor and record the completion of assembly operations, such as the torquing of the nuts 38. Additionally, a portable display 75 may be employed by an assembly worker to view the same or similar data that is displayed on display 74 so that the worker can monitor and verify which of the nuts 38 have been torqued, or have yet to be torqued.

Figure 8:
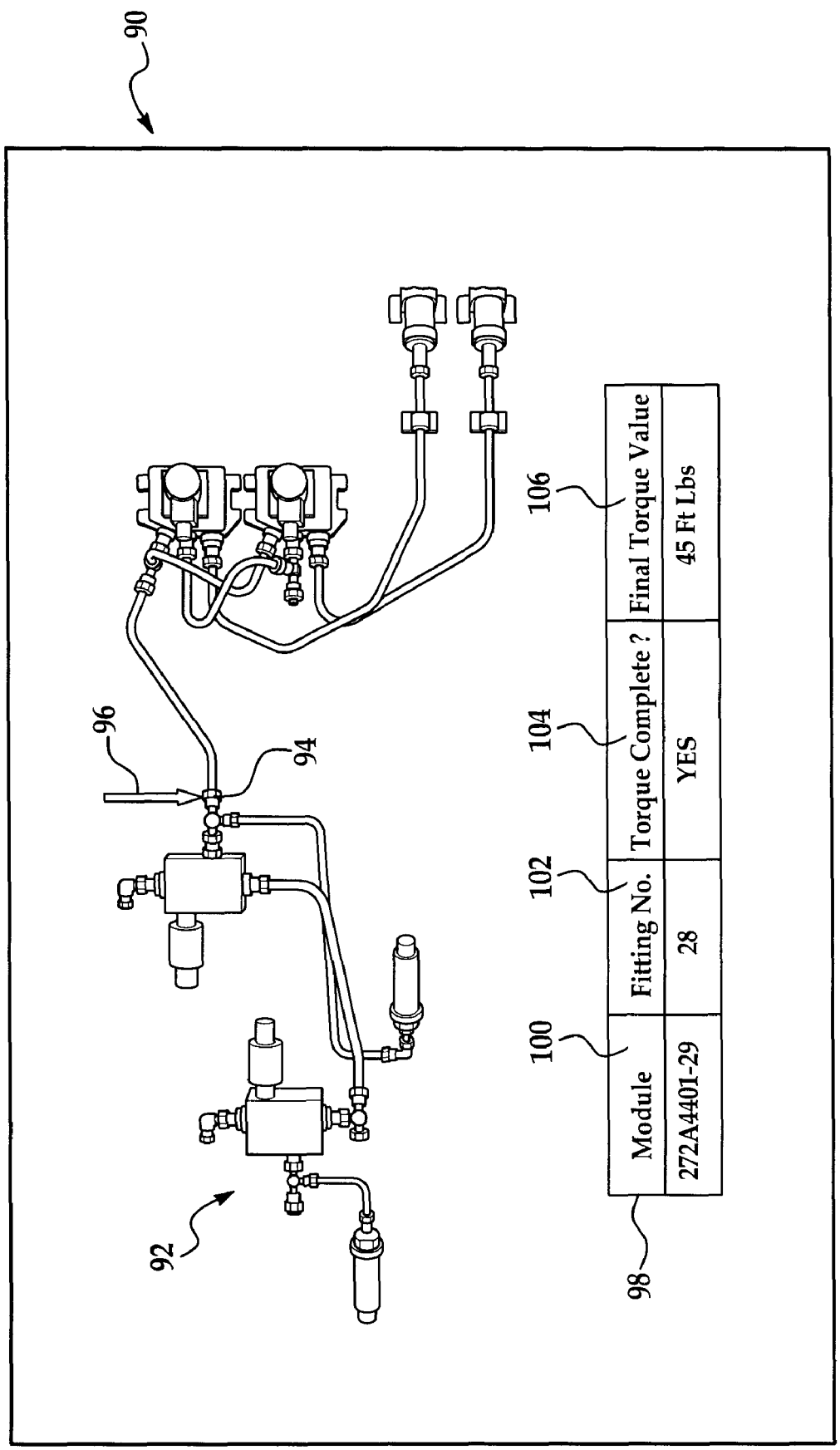
FIG. 8 is a typical screen display showing a monitored object and a reported condition.

Reference is now made to FIG. 8 which discloses a typical screen display 90 that may be viewed on either of the displays 74, 75. In this example, a hydraulic module 92 is displayed in which an arrow 96 is used to indicate a particular nut 94 that is or has just been torqued. Summary information in a table 98 may also displayed which may indicate a module number 100 identifying the module 92, a fitting number 102 identifying the particular fitting being torqued, the status 104 of torque completion and a final torque value 106.

Figure 9:
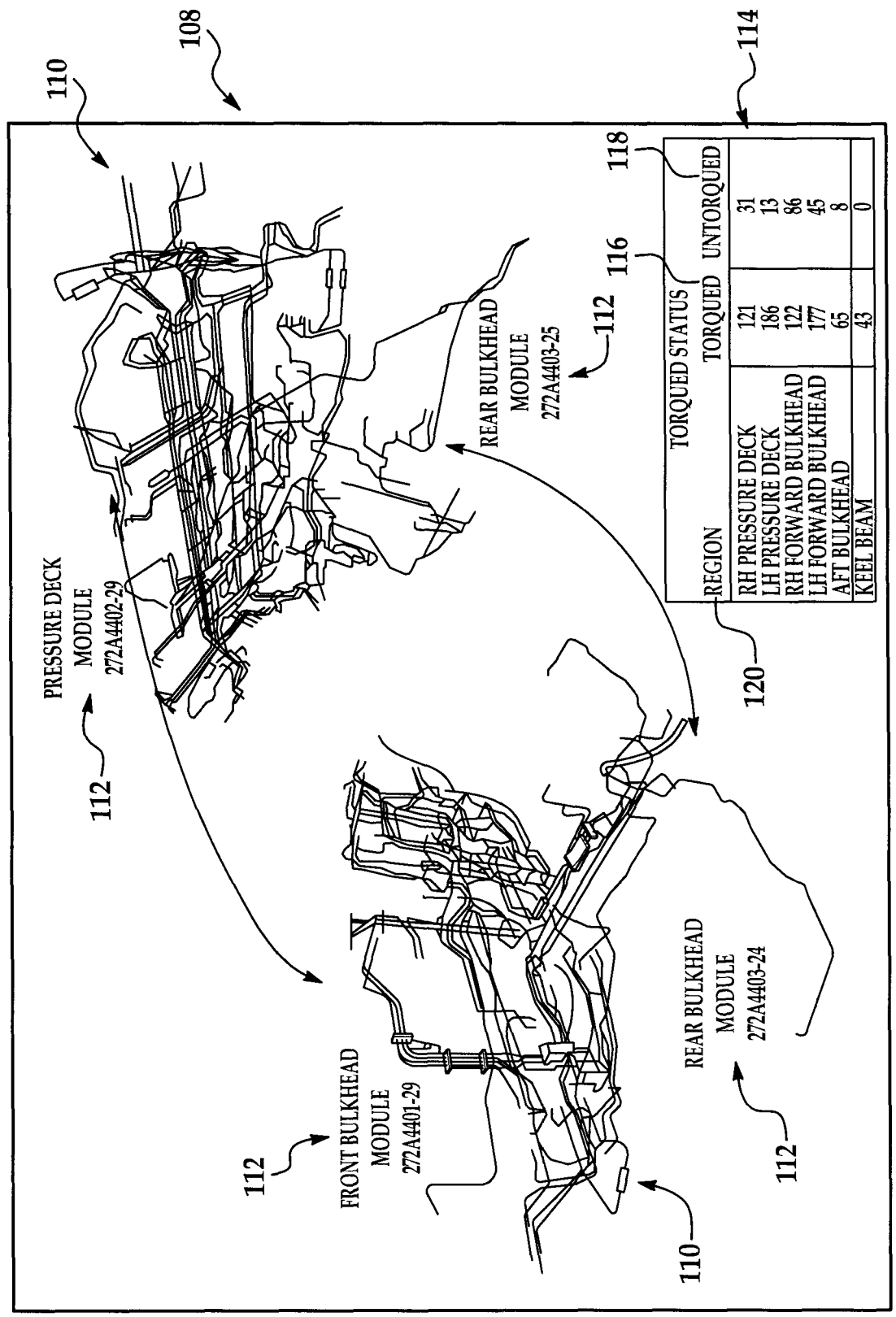
FIG. 9 is another screen display showing summary information related to the monitored objects and reported conditions.

Referring now also to FIG. 9, summary information may be displayed on the display 74 that may include groups 110 of modules along with indicia 112 that identifies the module group. Additionally, tables 114 may be displayed that show torque status in summary form. For example, the torque status may include the number 116 of nuts that have been torqued for a module group 110, and the number 118 of nuts that have not yet been torqued for each of the module group regions 120. A variety of other types of specific of summary information may be displayed along with images of the modules and/or fittings, all in real time while an assembly worker is assembling the fittings and torquing the nuts 38.

Figure 10:
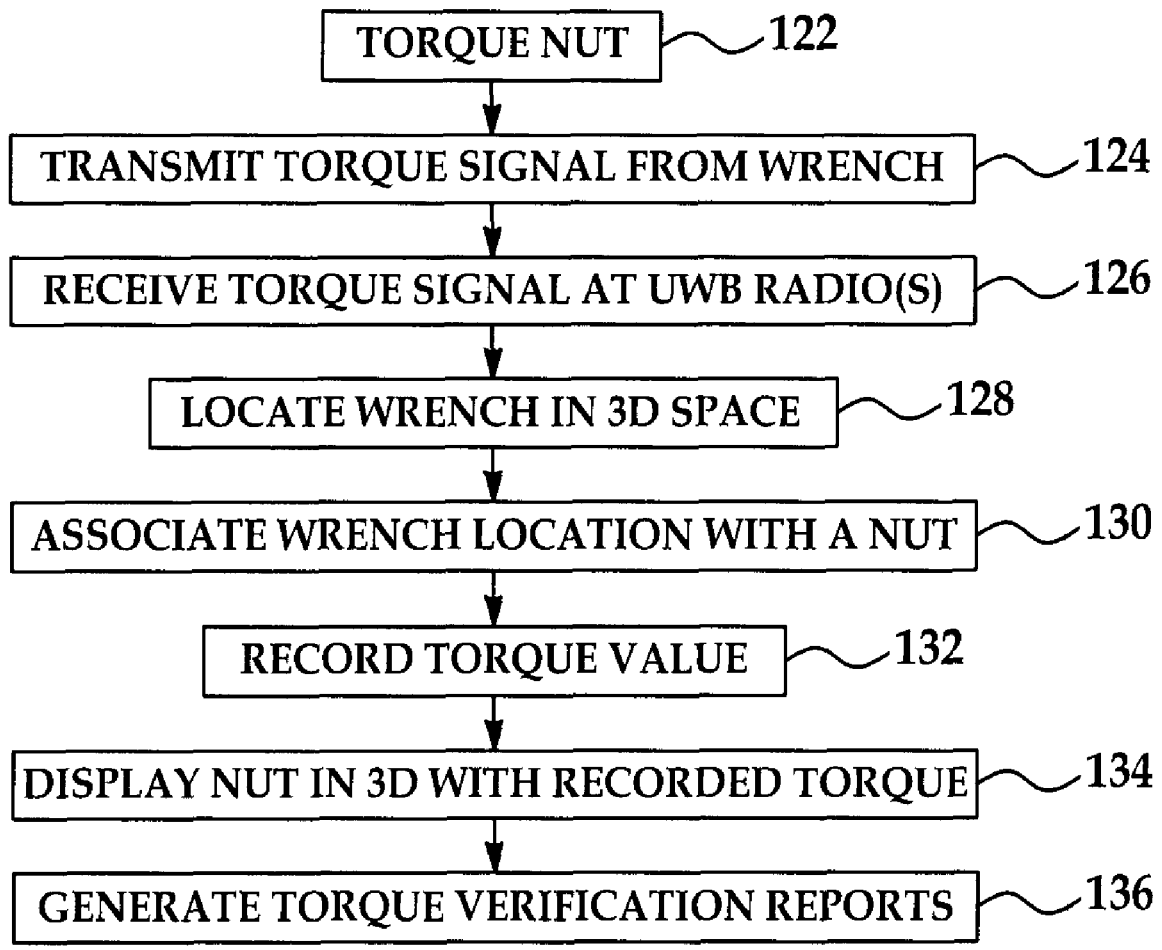
FIG. 10 is a simplified flow diagram illustrating a method for locating and reporting the condition of objects in harsh RF environments.

Referring to FIG. 10, according to a method embodiment, torquing of the nuts 38 may be monitored, recorded and displayed. Beginning at 122, a production worker uses the electronic wrench 44 to torque a nut 38. When the strain gauge 50 (FIG. 4) senses that the nominal torque value has been reached, the wrench 44 transmits torque signals comprising UWB pulse signals that contain the torque value, shown at step 124. The torque signals (UWB pulse signals) are received at the UWB radios 60 within the wheel well 36, as shown at 126. The resulting location measurements are then used by the processor 66 to calculate the location of the wrench 44 in three dimensional object space, as shown at 128. At 130, the processor 66 associates the wrench location with a particular nut 38, and at 132, the torque value for the nut is recorded. At 134, the processor 66 translates the location of the nut from the coordinate system 26 of the wheel well 36, to the coordinate system 34 of the three dimensional space represented by the displayed image. The nut 38 is then displayed along with the recorded torque value at 134. Torque verification reports may be optionally generated, as desired, at 136.

Figure 11:
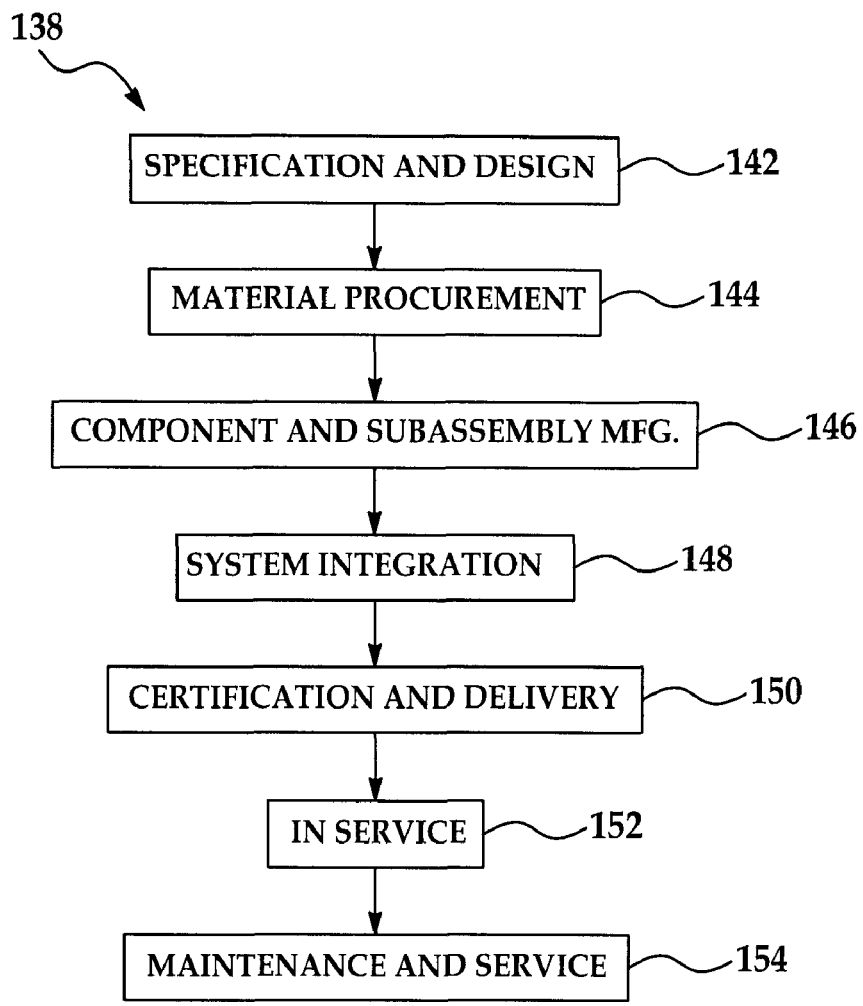
FIG. 11 is a flow diagram of aircraft production and service methodology.
Figure 12:
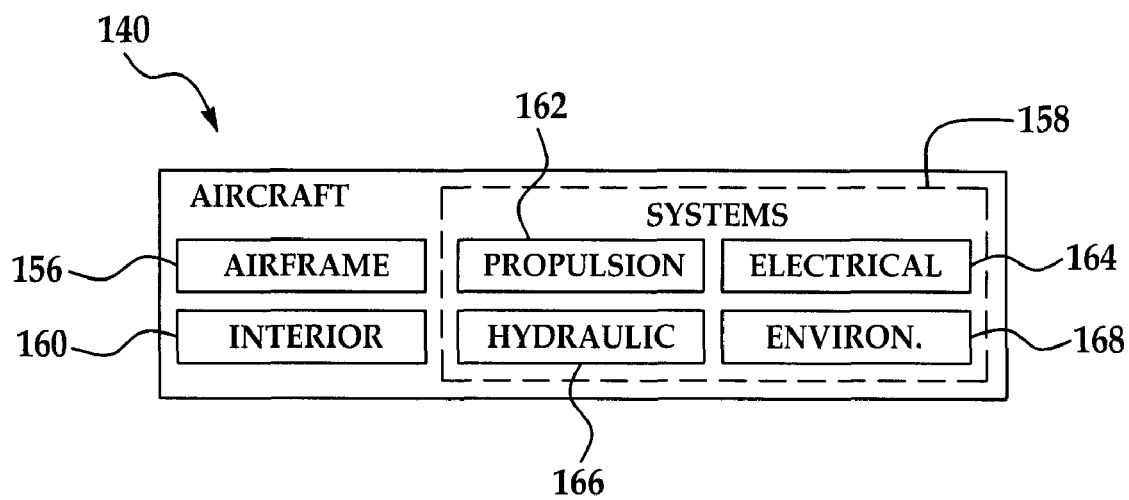
FIG. 12 is a block diagram of an aircraft.

Embodiments of the disclosure may find use in a variety of potential applications, particularly in the transportation industry, including for example, aerospace, marine and automotive applications. Thus, referring now to FIGS. 11 and 12, embodiments of the disclosure may be used in the context of an aircraft manufacturing and service method 138 as shown in FIG. 11 and an aircraft 140 as shown in FIG. 12. During pre-production, exemplary method 138 may include specification and design 142 of the aircraft 140 and material procurement 144. During production, component and subassembly manufacturing 146 and system integration 148 of the aircraft 140 takes place. Thereafter, the aircraft 140 may go through certification and delivery 150 in order to be placed in service 152. While in service by a customer, the aircraft 140 is scheduled for routine maintenance and service 154 (which may also include modification, reconfiguration, refurbishment, and so on).

Each of the processes of method 138 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 12, the aircraft 140 produced by exemplary method 138 may include an airframe 156 with a plurality of systems 158 and an interior 160. Examples of high-level systems 158 include one or more of a propulsion system 162, an electrical system 164, a hydraulic system 166, and an environmental system 168. Any number of other systems may be included. Although an aerospace example is shown, the principles of the disclosure may be applied to other industries, such as the marine and automotive industries.

Systems and methods embodied herein may be employed during any one or more of the stages of the production and service method 138. For example, components or subassemblies corresponding to production process 146 may be fabricated or manufactured in a manner similar to components or subassemblies produced while the aircraft 140 is in service. Also, one or more apparatus embodiments, method embodiments, or a combination thereof may be utilized during the production stages 146 and 148, for example, by substantially expediting assembly of or reducing the cost of an aircraft 140. Similarly, one or more of apparatus embodiments, method embodiments, or a combination thereof may be utilized while the aircraft 140 is in service, for example and without limitation, to maintenance and service 140.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A method of acquiring data relating to each of a plurality of objects located within a harsh radio frequency (RF) environment, comprising:
   moving a sensor to the location of each of the objects;
   sensing data at the object;
   transmitting the sensed data from the location of the object using ultra-wideband (UWB) pulse signals;
   receiving the UWB pulse signals at multiple positions within the harsh environment;
   using the received UWB pulse signals to generate location measurements related to the location of the object from which the sensed data was transmitted;
   using the location measurements to determine the location of the object in a first coordinate system; and,
   displaying an image of the object from which the sensed data was transmitted in a second coordinate system are processed/controlled by a processor.

2. The method of claim 1, wherein:
   the first coordinate system is a coordinate system within the harsh RF environment, and
   displaying the image of the object includes displaying a 3-dimensional image of the objects in the harsh RF environment from a graphics file, and wherein the second coordinate system is in the 3-dimensional image of the objects.

3. The method of claim 1, further comprising:
   placing the sensor on a tool; and
   performing an operation on the objects using the tool, wherein the sensed data relates to the operation performed on the objects.

4. The method of claim 3, wherein:
   the tool is a wrench,
   the sensor is a strain gauge, and
   the sensed data relates to torque applied by to the object by the wrench.

5. The method of claim 3, wherein generating the location measurements includes:
   measuring the angle of arrival and the time difference of arrival of the pulse signals at each of the multiple locations.

6. The method of claim 3, wherein the pulse signals are received by UWB radios respectively positioned at the multiple locations, and the method further comprises:
   compensating for bias in the measurements resulting from the delivery of the pulsed signals to one of the UWB radios being blocked.

* * * * *